(12) United States Patent
Ferguson et al.

(10) Patent No.: US 8,611,216 B2
(45) Date of Patent: Dec. 17, 2013

(54) MAINTAINING PACKET ORDER USING HASH-BASED LINKED-LIST QUEUES

(75) Inventors: Dennis C. Ferguson, Palo Alto, CA (US); Philippe Lacroute, Sunnyvale, CA (US); Chi-Chung Chen, Cupertino, CA (US); Gerald Cheung, Palo Alto, CA (US); Tatao Chuang, San Jose, CA (US); Pankaj Patel, Cupertino, CA (US); Viswesh Ananthakrishnan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 78 days.

(21) Appl. No.: 13/250,765

(22) Filed: Sep. 30, 2011

(65) Prior Publication Data
US 2012/0027019 A1    Feb. 2, 2012

Related U.S. Application Data

(60) Continuation of application No. 12/815,906, filed on Jun. 15, 2010, now Pat. No. 8,059,543, which is a continuation of application No. 11/755,292, filed on May 30, 2007, now Pat. No. 7,764,606, which is a division of application No. 10/193,212, filed on Jul. 12, 2002, now Pat. No. 7,243,184.

(60) Provisional application No. 60/388,361, filed on Jun. 14, 2002.

(51) Int. Cl.
*H04J 1/16* (2006.01)
*H04L 12/66* (2006.01)
*H04L 12/28* (2006.01)

(52) U.S. Cl.
USPC ............ 370/230; 370/253; 370/356; 370/416

(58) Field of Classification Search
None
See application file for complete search history.

(56) References Cited

U.S. PATENT DOCUMENTS

| 5,367,643 | A | * | 11/1994 | Chang et al. .................... 710/62 |
| 5,838,915 | A | * | 11/1998 | Klausmeier et al. .......... 709/215 |
| 5,872,769 | A | * | 2/1999 | Caldara et al. ................ 370/230 |
| 6,026,093 | A | * | 2/2000 | Bellaton et al. ............... 370/412 |
| 6,260,115 | B1 | | 7/2001 | Permut et al. |
| 6,343,078 | B1 | * | 1/2002 | Bronstein et al. ............. 370/400 |
| 6,564,302 | B1 | | 5/2003 | Yagi et al. |
| 6,658,485 | B1 | * | 12/2003 | Baber et al. ................... 719/314 |
| 6,772,300 | B1 | | 8/2004 | Manseau |
| 6,848,017 | B2 | | 1/2005 | MacEachern et al. |
| 7,092,401 | B2 | | 8/2006 | Craddock et al. |
| 7,180,887 | B1 | | 2/2007 | Schwaderer et al. |

(Continued)

OTHER PUBLICATIONS

Co-pending U.S. Appl. No. 12/815,906, filed Jun. 15, 2010 entitled "Maintaining Packet Order Using Hash-Based Linked-List Queues" by Dennis C. Ferguson et al., 35 pages.

*Primary Examiner* — Melanie Jagannathan
(74) *Attorney, Agent, or Firm* — Harrity & Harrity, LLP

(57) ABSTRACT

Ordering logic ensures that data items being processed by a number of parallel processing units are unloaded from the processing units in the original per-flow order that the data items were loaded into the parallel processing units. The ordering logic includes a pointer memory, a tail vector, and a head vector. Through these three elements, the ordering logic keeps track of a number of "virtual queues" corresponding to the data flows. A round robin arbiter unloads data items from the processing units only when a data item is at the head of its virtual queue.

20 Claims, 8 Drawing Sheets

(56) References Cited

U.S. PATENT DOCUMENTS

| | | |
|---|---|---|
| 7,243,184 B1 | 7/2007 | Ferguson et al. |
| 7,447,777 B1 | 11/2008 | Ahuja et al. |
| 7,466,703 B1 | 12/2008 | Arunachalam et al. |
| 7,764,606 B1 | 7/2010 | Ferguson et al. |
| 2001/0043564 A1* | 11/2001 | Bloch et al. .................. 370/230 |
| 2001/0048689 A1* | 12/2001 | Bennett et al. ................ 370/412 |
| 2003/0065809 A1* | 4/2003 | Byron ........................... 709/232 |

\* cited by examiner

MAINTAINING PACKET ORDER USING HASH-BASED LINKED-LIST QUEUES

RELATED APPLICATIONS

This application is a continuation of U.S. patent application Ser. No. 12/815,906, filed Jun. 15, 2010, which is a continuation of U.S. patent application Ser. No. 11/755,292, filed May 30, 2007 (now U.S. Pat. No. 7,764,606), which is a divisional of U.S. patent application Ser. No. 10/193,212, filed Jul. 12, 2002 (now U.S. Pat. No. 7,243,184), which claims priority under 35 U.S.C. §119 based on U.S. Provisional Application No. 60/388,361, filed Jun. 14, 2002, the disclosures of which are incorporated herein by reference.

BACKGROUND OF THE INVENTION

A. Field of the Invention

The present invention relates generally to data processing and data routing and, more particularly, to maintaining packet order within a router.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting, filtering, and policing functionality, these routers suffered performance degradation. In some instances, the routers failed to handle traffic at line rate when the new functionality was turned on.

To meet the new demands, purpose-built routers were designed. Purpose-built routers are designed and built with components optimized for routing. They not only handled higher line rates and higher network traffic volume, but they also added functionality without compromising line rate performance.

A purpose-built router may include a number of input and output ports from which it transmits and receives information packets. Packets may belong to the same data flow. Generally, packets in the same data flow should be transmitted from the router in the same order they are received by the router. In other words, it is undesirable for the router to reorder packets within a data flow.

In certain purpose-built routers, however, components within the router may have a tendency to reorder packets as the packets are being processed. For example, a router may include multiple route lookup engines executing in parallel and asynchronously with one another. Because the time to perform a route lookup may not be constant, the route lookup engines may finish processing packets in an out-of-order sequence relative to the order in which the engines began processing their packets.

Accordingly, there is a need to ensure that certain packets exit the router in the same order that they entered the router.

SUMMARY OF THE INVENTION

Systems and methods consistent with the principles of the invention, among other things, provide for an improved packet ordering technique that uses "virtual queues" to maintain packet order.

One aspect of the invention is an ordering device including processing units, a pointer memory, and a head vector. The processing units perform operations on data units that belong to data flows and the pointer memory stores linked lists corresponding to the data flows. Each of the linked lists describe a correct ordering of the data units in the data flows. The head vector stores state information relating to whether entries in the pointer memory correspond to a head data unit in the correct ordering of data units in the data flow.

A second aspect consistent with the principles of the invention is method of tracking the order of data units in data flows. The method includes generating hash values based on the data units, where the hash value for a particular data unit identifies the data flow to which the particular data unit belongs. The method further includes comparing the generated hash value to previously generated hash values to generate a comparison indicator, and updating a tail vector that identifies the end of a data flow when the comparison indicator is in a first state. The method also includes updating the tail vector and a head vector that identifies the beginning of the data flow when comparison indicator is in a second state.

Another aspect consistent with the principles of the invention is a method of receiving data items in a predetermined order. The method includes receiving requests to unload data items, the data items being associated with data flows, and writing to a request vector at a location based on the requests. Further, the method includes masking the request vector with a head vector that stores information related to data items that are at the head of a data flow and arbitrating the unloading of the data items based on the masked version of the request vector.

Yet another aspect of the invention is directed to a network device. The network device comprises a physical interface card configured to receive and transmit packets on a physical link, where the packets belong to data flows. The network device further comprises a memory configured to store data structures used in determining destination information for the packets and a route lookup component configured to determine the destination information for the packets based on the data structures. The route lookup component further includes route lookup key engines, each of which is configured to concurrently process packets using context switched memories; a request vector that stores requests from the route lookup engines to unload packets for which the route lookup engines have completed processing; a head vector configured to store whether a packet being processed by a context of the route lookup engines corresponds to a head packet in a data flow; and a reorder arbiter configured to arbitrate the unloading of the processed packets from the route lookup engines based on a masking of the request vector by the head vector such that the processed packets are unloaded in received packet order on a per-flow basis.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

Reorder logic, as described herein, ensures that certain packets remain in their original packet order as the packets are processed, such as by a number of parallel processing engines that operate asynchronously with respect to one another. An identification hash value is generated for each flow. The hash values are used in conjunction with a series of registers to implement "virtual queues" that ensure that packets within a data flow maintain the same order as they are read out from the parallel processing engines.

System Configuration

Figure 1:
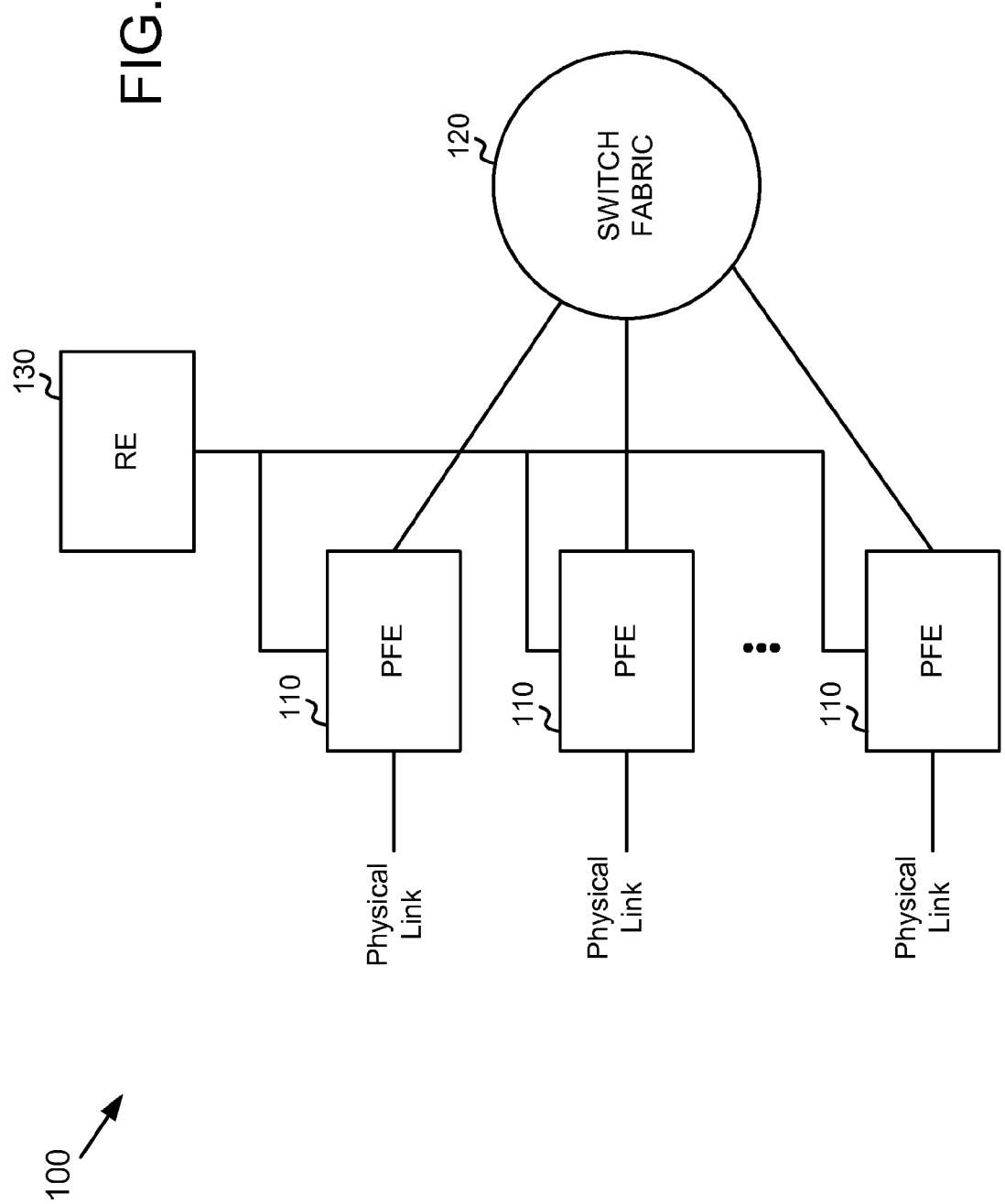
FIG. 1 is a block diagram illustrating an exemplary routing system in which principles consistent with the invention may be implemented.

FIG. 1 is a block diagram illustrating an exemplary routing system 100 in which the concepts consistent with the invention may be implemented. System 100 receives data streams from physical links, processes the data streams to determine destination information, and transmits the data streams out on links in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 creates routing tables based on network topology information, creates forwarding tables based on the routing tables, and forwards the forwarding tables to PFEs 110. PFEs 110 use the forwarding tables to perform route lookup for incoming packets. RE 130 also performs other general control and monitoring functions for system 100.

PFEs 110 are each connected to RE 130 and switch fabric 120. PFEs 110 receive data at ports on physical links connected to a network, such as a wide area network (WAN), a local area network (LAN), or a device. Each physical link could be one of many types of transport media, such as optical fiber or Ethernet cable. The data on the physical link is formatted according to one of several protocols, such as the synchronous optical network (SONET) standard or Ethernet.

PFE 110 processes incoming data by stripping off all or part of the data link layer. PFE 110 converts header information from the remaining data into data structures referred to herein as "notifications" and "cells" (where a cell may be a fixed length data structure). For example, in one embodiment, the data remaining after the data link layer is stripped off is layer 3 (L3) packet header data.

PFE 110 forms a notification based on the L2, L3, and control information, and performs a route lookup using the notification and the routing table from RE 130 to determine destination information. PFE 110 may also further process the notification to perform protocol-specific functions, policing, filtering, and accounting, and might even modify the notification to form a new notification.

If the determined destination indicates that the packet should be sent out on a physical link connected to PFE 110, then PFE 110 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 120, then PFE 110 retrieves the cells for the packet, modifies the cells with the new notification and new control information, if necessary, and sends the cells to the other PFE via switch fabric 120. The receiving PFE uses the notification to form a packet using the packet data from the cells, and sends the packet out on the port associated with the appropriate physical link of the receiving PFE. The receiving PFE may perform another route lookup to determine the appropriate physical link.

In summary, in one embodiment, RE 130, PFEs 110, and switch fabric 120 perform routing based on packet-level processing. PFEs 110 store each packet in cells while performing a route lookup using a notification, which is based on packet header information, including L2 and L3 layer header information. A packet might be received on one PFE and go back out to the network on the same PFE, or be sent through switch fabric 120 to be sent out to the network on a different PFE.

Figure 2:
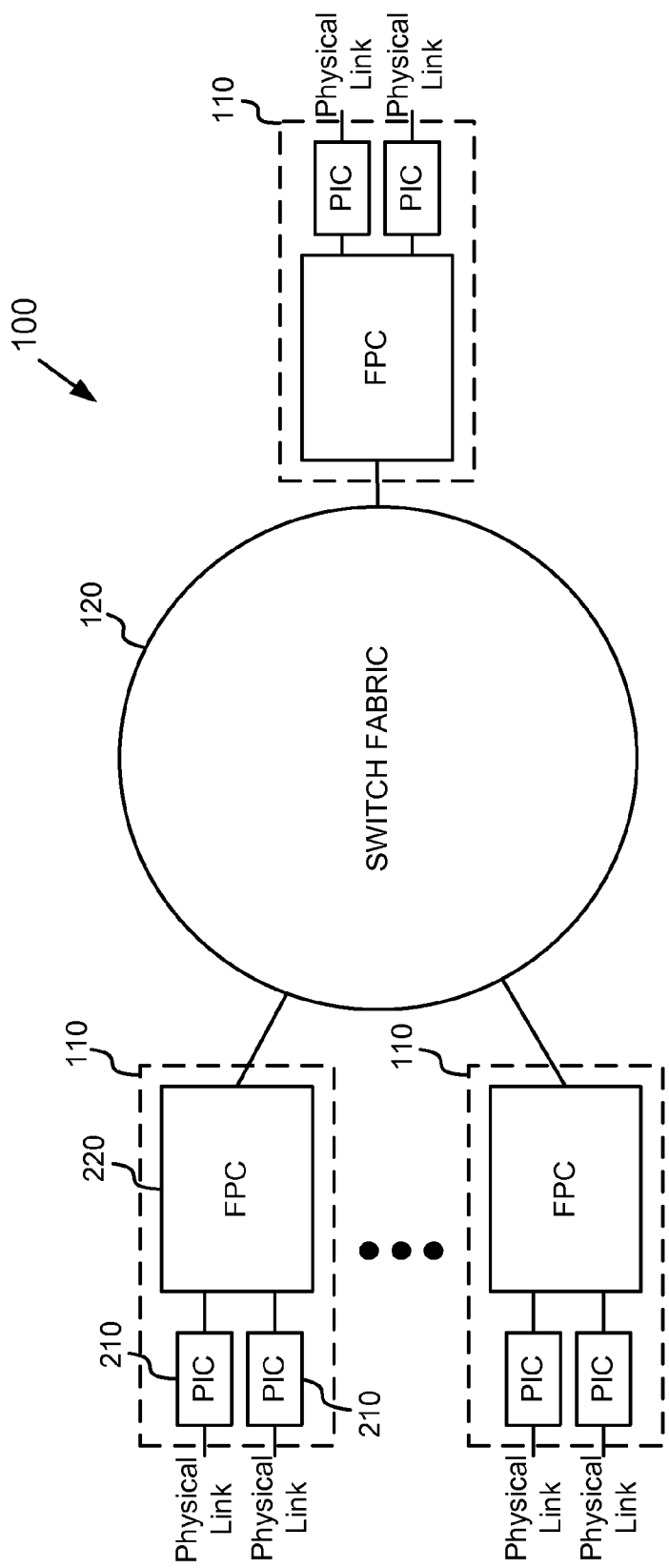
FIG. 2 is an exemplary detailed block diagram illustrating portions of the routing system shown in FIG. 1.

FIG. 2 is an exemplary detailed block diagram illustrating portions of routing system 100. PFEs 110 connect to one another through switch fabric 120. Each of the PFEs may include one or more physical interface cards (PICs) 210 and one or more flexible port concentrators (FPCs) 220.

PICs 210 may transmit data between a physical link and FPC 220. Different PICs are designed to handle different types of physical links. For example, one of PICs 210 may be an interface for an optical link while another PIC may be an interface for an Ethernet link.

FPCs 220 perform routing functions and handle packet transfers to and from PICs 210 and switch fabric 120. For each packet it handles, an FPC performs the previously-discussed route lookup function. Although FIG. 2 shows two of PICs 210 connected to each of FPCs 220 and three FPCs 220 connected to switch fabric 120, in other embodiments consistent with principles of the invention there can be more or fewer PICs 210 and FPCs 220 in a PFE 110.

Figure 3:
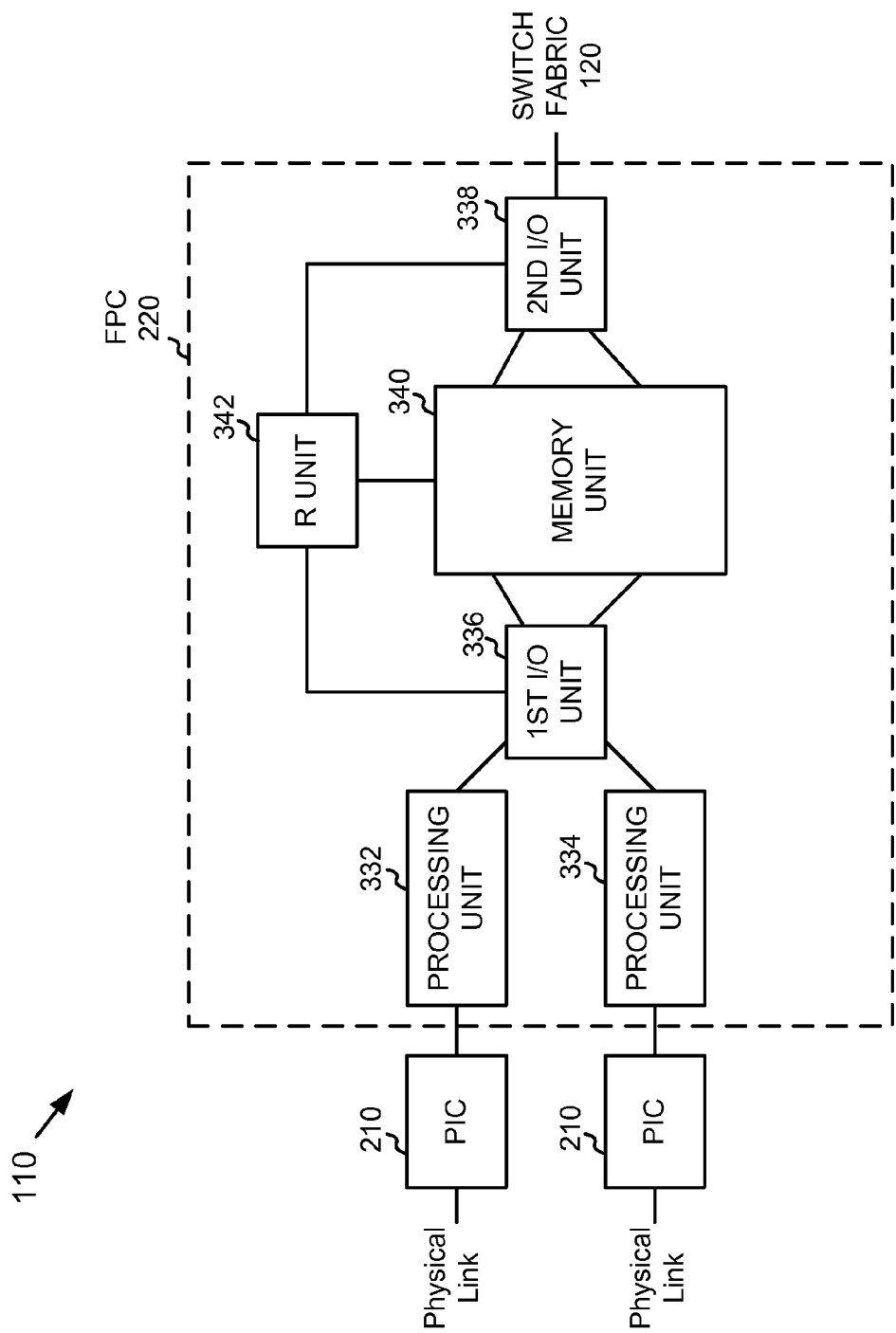
FIG. 3 is a diagram illustrating portions of FIG. 2 in additional detail.

FIG. 3 is an exemplary configuration of one of FPCs 220 according to an implementation consistent with the principles of the invention. Each FPC may include processing units 332 and 334, first input/output (I/O) unit 336, second I/O unit 338, memory unit 340, and R unit 342. Each processing unit 332 and 334 corresponds to a PIC 210.

Processing units 332 and 334 may process packet data flowing between PICs 210 and first I/O unit 336. Each processing unit 332 and 334 may process packet data received from the PIC connected to it, and data received from first I/O unit 336.

For example, processing unit 332 or 334 may process packets from PIC 210 to convert the packets into data cells, and transmit the data cells to first I/O unit 336. Data cells are the data structure used by FPC 220 internally for transporting and storing data.

Processing unit 332 or 334 may also receive data cells and notifications from first I/O unit 336, and create a packet based on the received data cells and notifications. Processing unit 332 or 334 creates the packet header based on the information extracted from the data cells. In one embodiment, processing unit 332 or 334 creates L2 and L3 header information based on the extracted information. The created L2 and L3 header information constitutes a new header that the packet uses as it is subsequently transmitted through the physical link.

R unit 342 may receive notifications from first I/O unit 336 and second I/O unit 338. R unit 342 may provide route lookup, accounting, filtering, and policing functionality based on the notifications. R unit 342 may receive one or more forwarding tables from RE 130 (FIG. 1) and use the forwarding table(s) to perform route and encapsulation lookups. R unit 342 may insert the lookup result into a notification, which it may store in memory unit 340.

Memory unit 340 may temporarily store data cells from first I/O unit 336 and second I/O unit 338 and notifications from R unit 342. Memory 340 may dispatch the notifications to first I/O unit 336 and second I/O unit 338. In response, first I/O unit 336 and second I/O unit 338 may use the address information in the notification to read out data cells from memory unit 340 that correspond to a notification. The notification received from memory unit 340 may have been modified by R unit 342 with route or encapsulation lookup results. First I/O unit 336 and second I/O unit 338 may update the data cells read out of memory unit 340 with information from the modified notification. The data cells, which now include information from the modified notification, are sent to processing unit 332, processing unit 334, or switch fabric 120, depending on which of first I/O unit 336 or second I/O unit 338 is processing the notification.

R Unit 342

Figure 4:
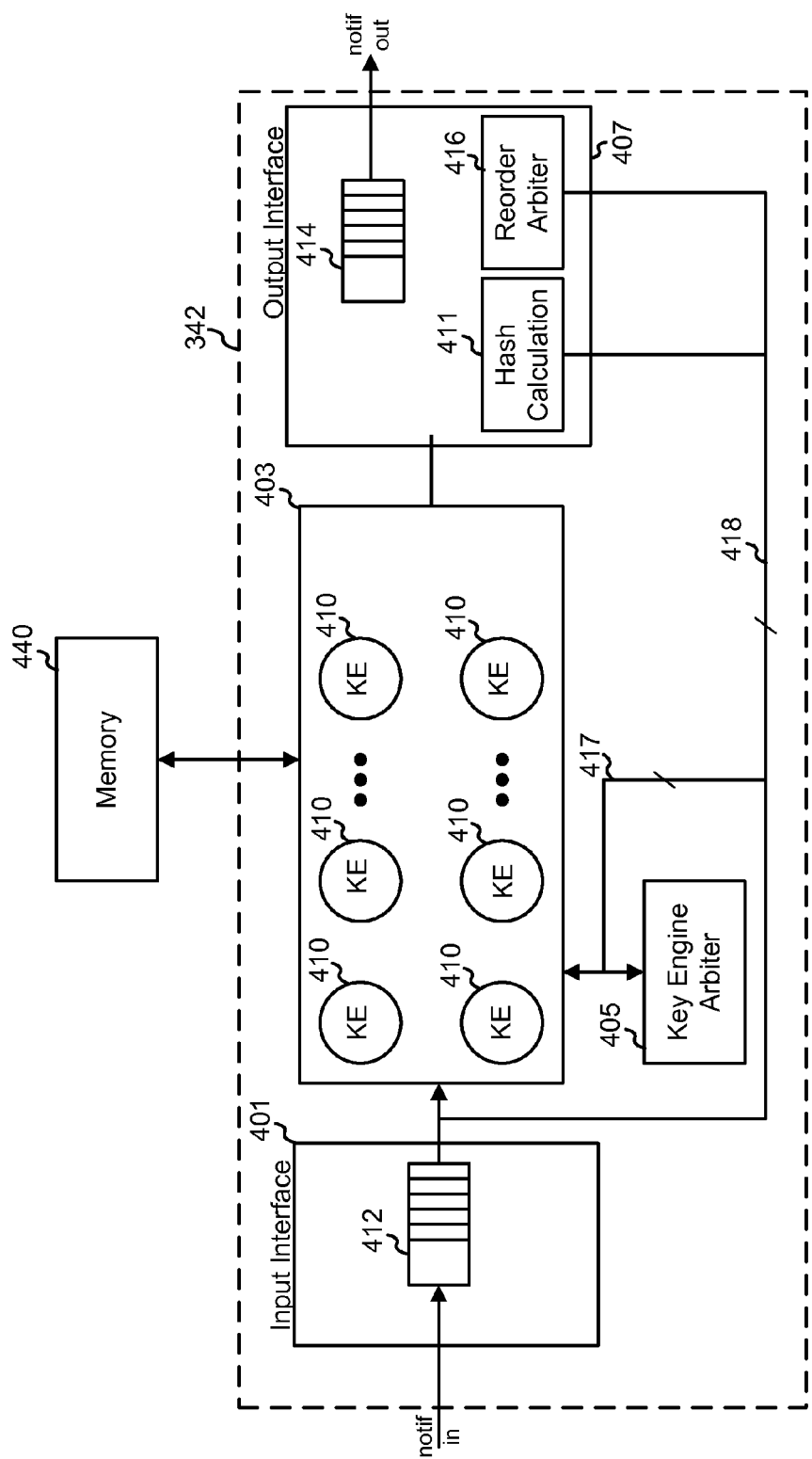
FIG. 4 is a diagram illustrating portions of FIG. 3 in additional detail.

FIG. 4 is a diagram illustrating portions of R unit 342 in additional detail. R unit 342 includes input interface component 401, key engine component 403, key engine arbiter 405, and output interface component 407. Additionally, a memory 440 is shown in FIG. 4. Memory 440 may be a high performance static RAM (SRAM) that stores data structures used by R unit 342 in performing route lookups.

In general, R unit 342 receives notifications, processes the notifications to obtain route lookup information, and outputs the notifications including the new route lookup result. Although R unit 342 will be described herein as processing notifications, one of ordinary skill in the art will understand that other types of data units, such as a packet or some other form of data, may instead be processed without departing from the principles of the invention. In the implementation described, a notification is a simplified version of a packet that emphasizes the control and routing information portion of the packet.

Incoming notifications are received by input interface component 401, which may queue the notifications in first-in-first-out (FIFO) queue 412. Key engine arbiter 405 arbitrates the flow of notifications from FIFO 412 to key engine component 403.

Key engine component 403 may include multiple independent key engines 410. Key engines 410 may access data structures in memory 440 that the key engines use in generating route lookup information for notifications. In one implementation, there are 28 key engines 410. Key engines 410 experience latency when requesting information from memory 440. In order to maximize processing efficiency despite the latency of memory 440, each of key engines 410 may include the ability to switch between operation "contexts." More specifically, a key engine performing a route lookup for a first notification may make a request to memory 440. While the key engine is waiting for the response to this request, it may switch its present operation context and perform work on a route lookup for a second notification. In one implementation, each key engine 410 can process up to four notifications concurrently—one in each of four different contexts. In this implementation, key engine component 403 has a maximum capacity of 112 contexts (28 key engines×4 contexts per key engine).

As mentioned, key engine arbiter 405 controls the loading of packet information (e.g., notifications) into key engines 410. More specifically, key engine arbiter 405 keeps track of which key engine contexts are free and directs the next notification in FIFO 412 to one of the free contexts.

Output interface 407 includes an output FIFO queue 414 and reorder arbiter component 416. Notifications are unloaded from key engines 410 into FIFO 414 after key engine 410 that was assigned the notification completes its processing of the notification and reorder arbiter 416 gives permission to unload the notification. FIFO 414 queues the processed notifications to await transmission from R unit 342.

When processing the notifications, it is desirable to unload the notifications from KEs 410, and thus FIFO 414, in the same order that the notifications were loaded into FIFO 412. More specifically, notifications from the same data flow should not be reordered by key engine component 403. However, in certain situations, key engine component 403 may finish processing of some notifications before it finishes processing of earlier received notifications, thus leading to the possibility of notification reordering. For example, due to the context switching nature of key engines 410, and due to variable delays in accessing memory 440, and performing other processing on the notifications, key engines 410 may reorder notifications within a data flow.

Consistent with an aspect of the invention, reorder arbiter 416 arbitrates the unloading of notifications from key engines 410 such that notifications from the same data flow are unloaded from key engines 410 in the same order that the notifications are loaded into key engines 410. Thus, reorder arbiter 416 enforces a per-flow ordering policy. Reorder arbiter 416 uses buses 417 and 418 to monitor the notifications entering key engine component 403 and the arbitration decisions made by key engine arbiter 405.

Hash calculation component 411 generates hash values that are used to classify the notifications in key engines 410 based on the data flow. In general, hash functions take an input block of data and process the block to obtain a numerical value that represents the given input data. The resulting hash may be a fixed length value. The hash value may serve as a signature for the data over which it was computed. Suitable hash functions are readily known in the art and will not be discussed in detail herein. An example of a hash function is the Cyclic Redundancy Check (CRC).

In one implementation, hash calculation component 411 computes a 20-bit hash value based on the data in the notification. In particular, the hash value may be computed based on the protocol type, the incoming interface, the IP source address, the IP destination address, the source port of the packet, or a combination of these. This information is included in the notification and it identifies the data flow to which the packet belongs. The hash value generated by hash calculation component 411 is used as a compact representation of the notification's data flow.

The reordering logic of R unit 342 may use the hash values to ensure the ordering of notifications loaded and unloaded by key engine component 403. An exemplary embodiment of the reordering logic will next be described.

Reording Logic

Figure 5:
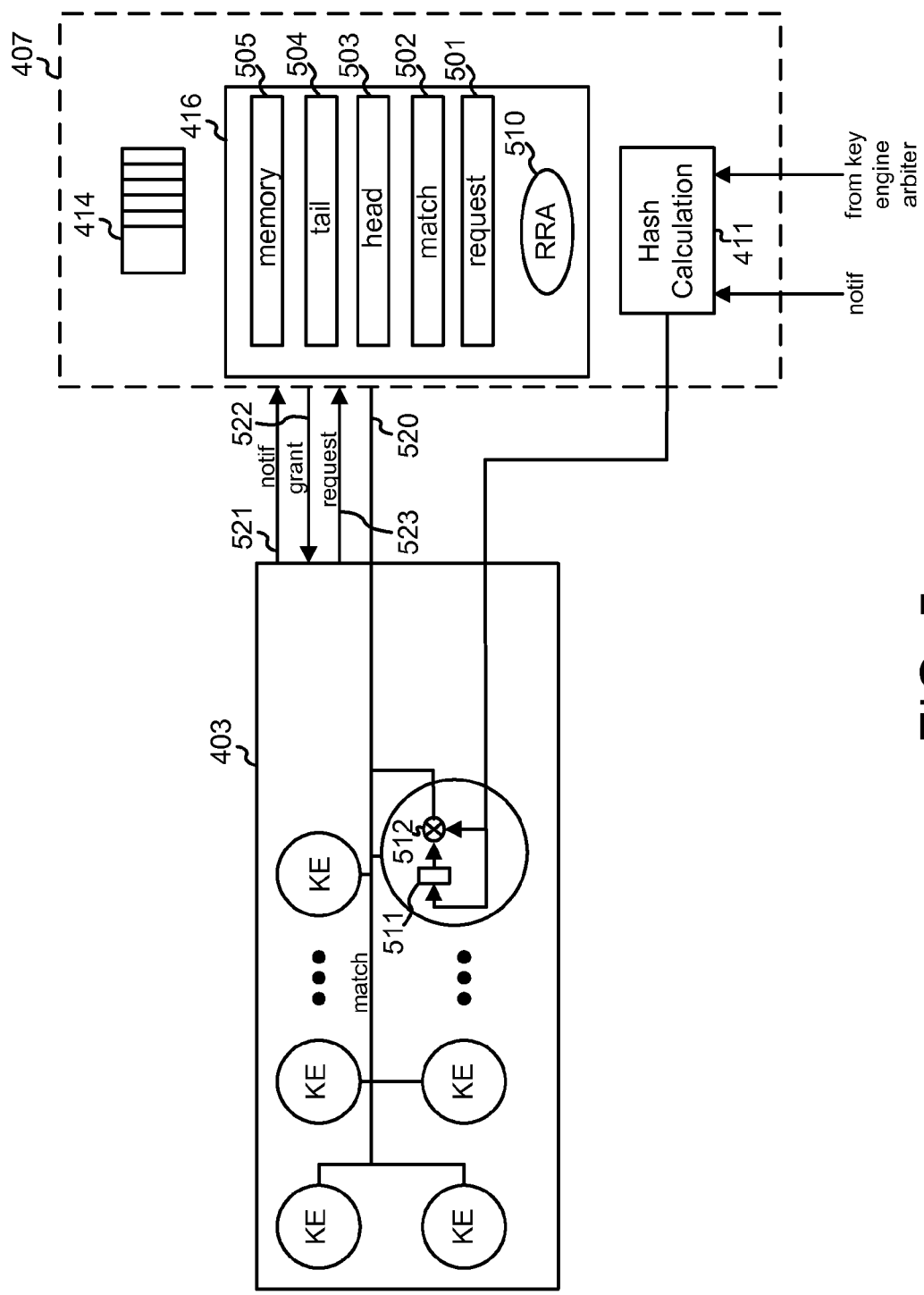
FIG. 5 is a diagram illustrating portions of the reorder arbiter shown in FIG. 4 in additional detail.

FIG. 5 is a diagram illustrating portions of R unit 342, in particular reorder arbiter 416, in additional detail. Reorder arbiter 416 includes a pointer memory 505, registers 501-504, and a round robin arbiter (RRA) 510. More particularly, registers 501-505 include request vector 501, match vector 502, head vector 503, and tail vector 504. In one implementation, each of vectors 501-504 includes a bit corresponding to each of the 112 contexts supported by the key engines 410.

Request vector 501 stores which of the contexts of key engines 410 have completed processing of their notification and are ready to be unloaded from the key engine. Match vector 502 keeps track of the state of each context. The bit corresponding to a particular context may be set when the context is processing a notification. Head vector 503 keeps track of whether a notification being processed by key engine component 403 is at the head of its data flow. Stated differently, if a notification is next in line from its data flow to be transmitted to output FIFO 414, the bit in head vector 503 corresponding to the context of the notification may be set. Tail vector 504 keeps track of whether a notification being processed by key engine component 403 is at the tail (end) of the packet within a data flow being processed by KEs 410.

Pointer memory 505 implements an array of pointers used to keep track of the order of notifications within a data flow that are currently being processed by KEs 410. In one implementation, pointer memory 505 contains 112 entries, one corresponding to each context. Each entry may be a seven bit word. In operation, reorder arbiter 416 sets the value of a particular one of the entries in pointer memory 505 to point to the entry that corresponds to the context that is processing the next notification in the data flow. In this manner, pointer memory 505 may implement multiple linked lists, where each of the linked lists corresponds to a data flow.

Figure 6:
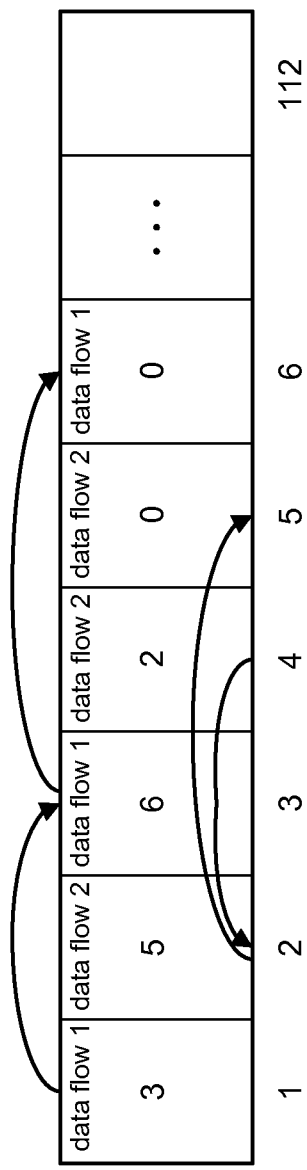
FIG. 6 is a diagram illustrating linked lists within a memory.

FIG. 6 is a diagram illustrating linked lists within pointer memory 505. For ease of explanation, two linked lists occupying only a portion of pointer memory 505 are shown in FIG. 6. The first link list corresponds to notifications in a data flow labeled as data flow 1. The head of this linked list is at address one in pointer memory 505. The fact that address one corresponds to the head of a data flow may be indicated by setting bit one of head vector 503. The content of address one, e.g., three, is a pointer value that indicates that the third address in pointer memory 505 contains the next entry in the linked list. As shown, the second notification in the first linked list is at address three (pointer to by the contents of address one), and the third notification is at address six (pointed to by the contents of address three). This indicates that the third context in key engine component 403 is processing the second notification in data flow 1 and the sixth context in key engine component 403 is processing the third notification in data flow 1. The head of the second linked list, corresponding to data flow two, is at address four. As shown, this linked list has additional notifications at address two and address five.

Returning to FIG. 5, round robin arbiter 510 selects notifications from contexts that have requested unloading and have their bit set in head vector 503, as indicated in request vector 501. Once selected, the notification is unloaded from key engine component 403 into output FIFO 414. Although described as a round robin arbiter, in alternate implementations, arbiter 510 may arbitrate from request vector 501 using arbitration schemes other than a round robin arbitration scheme.

Output interface 407 is coupled to key engine component 403 through a number of buses, including a notification bus (labeled as notification bus 521), a grant bus (labeled as grant bus 522), a request bus (labeled as request bus 523), and a match bus (labeled as match bus 520). Key engines 410 that have completed processing of a notification request unloading of the notification via the request bus 523. Output interface 407 confirms the unload request via the grant bus 521. In response, the requesting key engine 410 transmits its notification to output FIFO 414 via the notification bus 521.

A portion of one of key engines 410 is illustrated in more detail in FIG. 5. This key engine 410 includes a comparator 512 and a storage register 511. Each key engine 410 may include a separate comparator 512 and storage register 511 for each context implemented by the key engine (e.g., each key engine may include four comparator/storage register sets). In operation, as will be described in more detail below, hash values from hash calculation component 411 are compared by comparator 512 to hash values previously stored in storage register 511.

Operation of Reordering Logic

Figure 7:
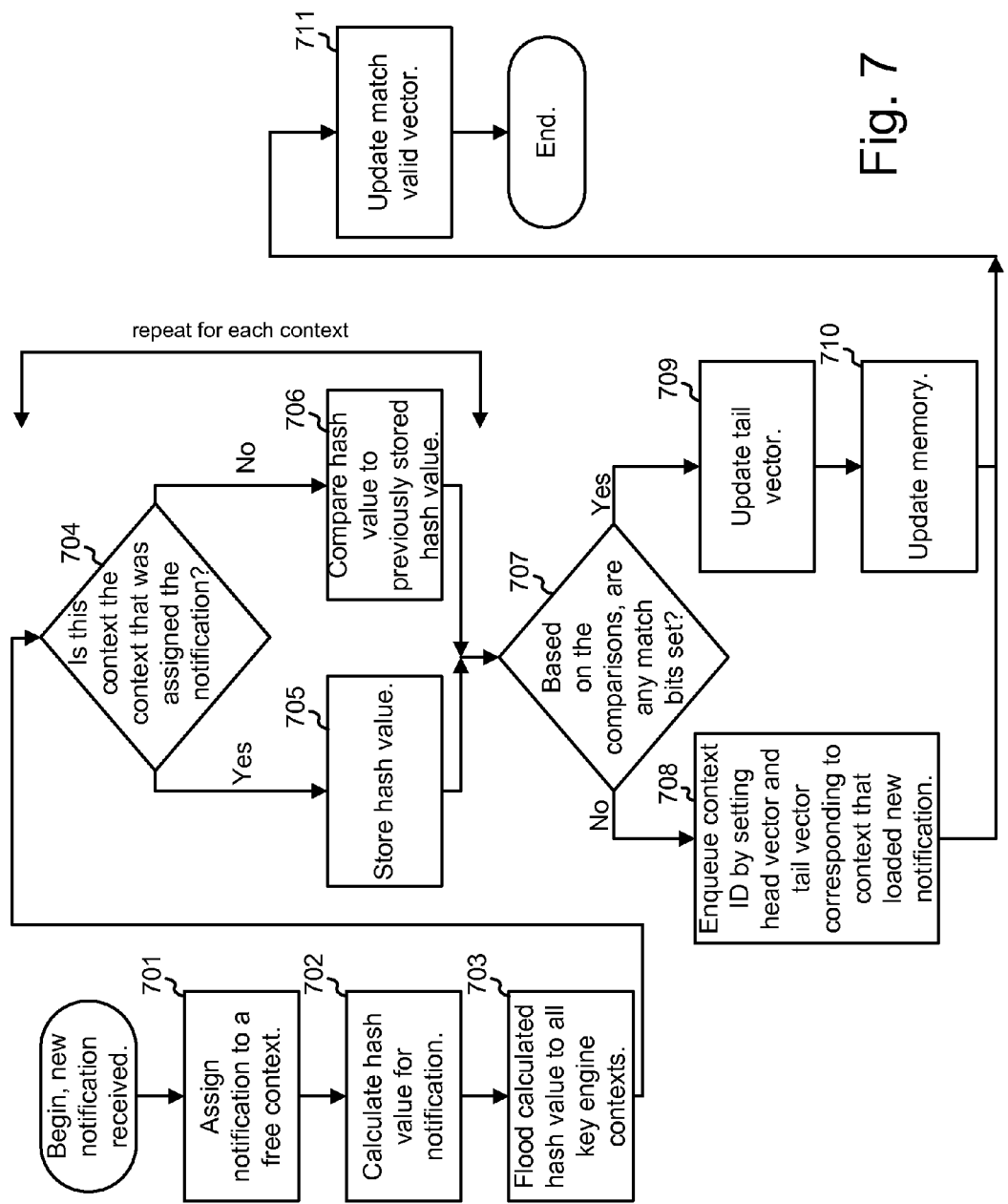
FIG. 7 is a flow chart illustrating exemplary operation when receiving notifications according to principles consistent with the invention.

FIG. 7 is a flow chart illustrating exemplary operation of R unit 342, including reorder arbiter 416, when receiving notifications from FIFO 412 of input interface 401. Notifications received from FIFO 412 are assigned to a free context of one of key engines 410 by key engine arbiter 405 (act 701). In general, key engine arbiter 405 may assign notifications to the key engines in an equitable manner such that bandwidth through the key engines is balanced. Hash calculation component 411 also receives the notification, and calculates a hash value for the notification (act 702). As discussed above, the hash value generated by hash calculation component 411 identifies the data flow to which the packet corresponding to the notification belongs.

After calculating the hash value, hash calculation component 411 floods the hash value to each context in each of key engines 410 (act 703). If the receiving context is the context that was selected by key engine arbiter 405 to process the notification, the context stores the hash value in its storage register 511 (act 704 and 705). The remaining key engines compare, for each of their contexts, the flooded hash value to their previously stored hash value (act 704 and 706). The comparison may be performed using comparators 512. Match bus 520 is driven with an indication of the result of each of the comparisons. In one implementation, in which there are 112 contexts, match bus 520 may be a 112-bit wide bus.

The match signals are received by reorder arbiter 416. The reorder arbiter, through buses 417 and 418, also receives information relating to the notification and the key engine context that was selected by key engine arbiter 405 to receive the notification. Reorder arbiter 416 examines the values received from match bus 520 and determines whether any of the bus values are set (act 707). If none of the bits in match bus 520 are set, this indicates that the notification is the first notification of a new data flow. Accordingly, reorder arbiter 416 enqueues a context ID of the first notification of a data flow by setting the bit in the head vector 503 and the tail vector 504 corresponding to the notification context (when there is only one item in a queue, the item is both the head and the tail of the queue) (act 708).

Alternatively, if at least one of the bits in match bus 520 is set, which indicates that the data flow has other notifications in it, reorder arbiter 416 updates tail vector 504 (act 709). Updating the tail vector may include clearing the previous tail bit for the data flow in tail vector 504 and setting the bit corresponding to the newly received notification. Reorder arbiter 416 updates pointer memory 505 to reflect the new notification by changing the value in the previous tail location to point to the new tail location (act 710). Acts 709 and 710 effectively enqueue a context that is not the first context of a data flow. Finally, reorder arbiter 416 may update match valid vector 502 to indicate that the new notification is being processed at its assigned context (act 711).

Figure 8:
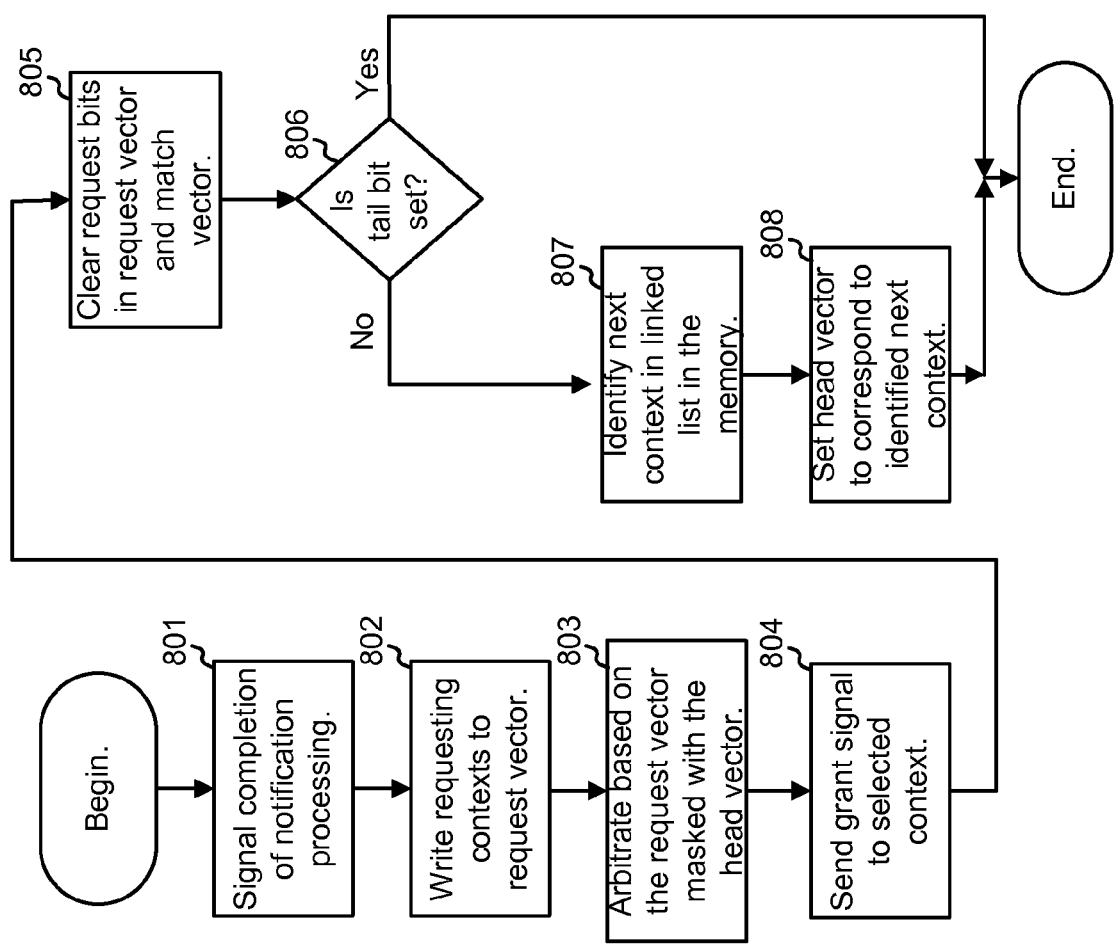
FIG. 8 is a flow chart illustrating the unloading of notifications from contexts that have completed processing according to principles of the invention.

FIG. 8 is a flow chart illustrating exemplary operation of R unit 342 when unloading notifications from contexts that have completed processing. When a key engine has completed work for a notification in a context, it signals that it is ready to have that notification unloaded via request bus 523 (act 801). Multiple contexts (from multiple key engines) may request to have their notifications unloaded in the same cycle. Reorder arbiter 416 writes the requesting contexts from request bus 523 to request vector 501 (act 802).

RRA 510 may arbitrate among the requests in request vector 501 using a round robin arbitration scheme that selects among the requests in request vector 501 after masking the request vector 501 by the head vector 503 (act 803). In other words, requests that are not at the head of a data flow are zeroed before being transmitted to RRA 510. In this manner, RRA 510 does not see requests that are not at the head of a data flow (i.e., at the head of the virtual queue corresponding to the data flow), and thus does not select these requests.

Unload requests granted by RRA 510 are signaled to the corresponding key engine context via grant bus 522 (act 804). In response, the key engine transmits its notification to output FIFO 414, for eventual unloading from R unit 342. Additionally, when a request is granted, reorder arbiter 416 clears the corresponding request bit in request vector 501 and in match vector 502 (act 805).

Reorder arbiter 416 may next check the status of the corresponding tail bit in tail vector 504 (act 806). If the tail bit is set, the selected context is the only entry in its linked list (i.e., in its data flow), and no additional action is needed. If the tail bit is not set, then reorder arbiter 416 uses the content of pointer memory 505 at the address of the selected context to find the next context in the link list (act 807). The bit in head vector 503 corresponding to the next context is set, indicating that this context is now the head context for that particular data flow (act 808).

CONCLUSION

As described above, reordering logic ensures that packets from the same data flow remain in order. Through vector registers and a linked list memory, the reorder arbiter manages virtual queues that ensure that the packets remain in the correct packet order. The virtual queues require significantly less circuitry resources than implementing an actual queue for each data flow. More particularly, the virtual queues, in implementing a queuing scheme which maintains state information per processing unit rather than per queue, require circuit resources proportional to the number of key engines instead of the number of data flows.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although the key engines were described as each implementing a number of contexts, in alternate implementations, a key engine may process a single notification at a time.

Moreover, while a series of acts has been presented with respect to FIGS. 7 and 8, the order of the acts may be different in other implementations consistent with principles of the invention. Additionally, lines with arrows are used in the figures to generally illustrate the flow of data. In practice, embodiments consistent with the principles of the invention may send data on these lines in both directions.

PFEs 110 may be implemented in hardware, software, or some combination thereof. For example, various portions of PFEs 110 may be implemented in application-specific integrated circuits (ASICs). The ASICs may be configured to perform some processing via dedicated logic, and may also be configured to perform some processing using microcode instructions that may be stored in memory. Those skilled in the router art will appreciate that the invention described herein might be practiced using a variety of hardware configurations in addition to, or instead of, ASICs. For example, some combination of general purpose processors, digital signal processors (DSPs), and programmable gate arrays (PGAs) may also be used to implement the functionality described herein.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A device comprising:
  a first memory to store a plurality of groups of entries,
    each group of entries, of the plurality of groups of entries, corresponding to a different one of a plurality of data flows, and
    each group of entries, of the plurality of groups of entries, identifying an order of data units of a corresponding one of the plurality of data flows;
  a second memory to store information identifying a head data unit of each of the plurality of data flows;
  a third memory to store data units of a particular data flow of the plurality of data flows; and
  an output unit to transmit the data units, of the particular data flow, based on:
    a group of entries, of the plurality of groups of entries, corresponding to the particular data flow, and
    the information, stored in the second memory, associated with the particular data flow,
      a particular address of a first entry, of the group of entries corresponding to the particular data flow, corresponding to a processing unit that processes information related to a particular data unit of the data units of the particular data flow, and
      the first entry identifying another processing unit that processes information related to another data unit of the data units of the particular data flow,
        the particular data unit preceding the other data unit in the particular data flow.

2. The device of claim 1, further comprising:
  a component to generate a value for each data unit of the plurality of data flows,
    where the values, generated for the data units of the particular data flow, identify the particular data flow, and
    where entries, of the group of entries corresponding to the particular data flow, are stored based on the values generated for the data units of the particular data flow.

3. The device of claim 2, where the component is to generate the value for a data unit, of the data units of the plurality of data flows, based on at least one of:
 a protocol type associated with the data unit,
 an incoming interface associated with the data unit,
 an Internet Protocol (IP) source address associated with the data unit,
 an IP destination address associated with the data unit, or
 a source port associated with the data unit.

4. The device of claim 2, where one or more entries, of the group of entries corresponding to the particular data flow, identify one or more other entries of the group of entries corresponding to the particular data flow.

5. The device of claim 1, where the particular data unit corresponds to a first data unit of the particular data flow,
 where the other data unit corresponds to a second data unit of the particular data flow, and
 where the second memory stores information identifying the particular data unit.

6. The device of claim 1, further comprising:
 a fourth memory to store information identifying a last data unit of each of the plurality of data flows,
 where the output unit, when transmitting the data units of the particular data flow, transmits the data units further based on the information, stored in the fourth memory, identifying the last data unit of the particular data flow.

7. A method comprising:
 storing, by a device and in a first memory, a plurality of groups of entries,
  each group of entries, of the plurality of groups of entries, corresponding to a different one of a plurality of data flows, and
  each group of entries, of the plurality of groups of entries, identifying an order of data units of a corresponding one of the plurality of data flows;
 storing, by the device and in a second memory, information identifying a head data unit of each of the plurality of data flows; and
 transmitting, by the device, data units of a particular data flow of the plurality of data flows,
  the data units, of the particular data flow, being transmitted based on:
   a group of entries, of the plurality of groups of entries, corresponding to the particular data flow, and
   the information, stored in the second memory, identifying the head data unit of the particular data flow,
    a particular address of a first entry, of the group of entries corresponding to the particular data flow, corresponding to a processing unit that processes information related to a particular data unit of the data units of the particular data flow, and
    the first entry identifying a processing unit that processes information related to another data unit of the data units of the particular data flow, the particular data unit preceding the other data unit in the particular data flow.

8. The method of claim 7, further comprising:
 storing, in a third memory, information identifying a last data unit of the particular data flow,
 where transmitting the data units of the particular data flow includes:
  transmitting the data units of the particular data flow further based on the information identifying the last data unit.

9. The method of claim 8, further comprising:
 generating a value for a data unit of the data units of the particular data flow;
 determining, based on the generated value, whether the data unit is the last data unit of the particular data flow,
 where storing the information identifying the last data unit includes:
  storing, in the third memory, information identifying the data unit when the data unit is the last data unit.

10. The method of claim 7, further comprising:
 generating a value for each of the data units of the particular data flow,
  where each of the values is generated based on a corresponding one of the data units of the particular data flow, and
  where entries, of the group of entries corresponding to the particular data flow, are stored in the first memory based on the values generated for the data units of the particular data flow.

11. The method of claim 10, where generating the value for the particular data unit includes:
 generating the value for the particular data unit based on at least one of:
  a protocol type associated with the particular data unit,
  an incoming interface associated with the particular data unit, or
  an Internet Protocol (IP) address associated with the particular data unit.

12. The method of claim 10, further comprising:
 determining whether the particular data unit is the head data unit of the particular flow unit, based on the value generated for the particular data unit; and
 storing, in the second memory, information associated with the particular data unit when the particular data unit is the head data unit of the particular flow unit.

13. The method of claim 7, where one or more entries, of the group of entries corresponding to the particular data flow, identify one or more other entries of the group of entries corresponding to the particular data flow.

14. A system comprising:
 a device comprising:
  a first memory to store a plurality of groups of entries,
   each group of entries, of the plurality of groups of entries, corresponding to a different one of a plurality of data flows,
   each group of entries, of the plurality of groups of entries, identifying an order of data units of a corresponding one of the plurality of data flows; and
  a second memory to store information identifying a head data unit of each of the plurality of data flows,
  the device transmitting data units, of a particular data flow of the plurality of data flows, based on:
   a group of entries, of the plurality of groups of entries, corresponding to the particular data flow, and
   the information, stored in the second memory, identifying the head data unit of the particular data flow,
    a particular address of a first entry, of the group of entries corresponding to the particular data flow, corresponding to a processing unit that processes information related to a particular data unit of the data units of the particular data flow, and
    the first entry identifying a processing unit that processes information related to another data unit of the data units of the particular data flow, the particular data unit preceding the other data unit in the particular data flow.

15. The system of claim 14, where the device is further to:

generate a value for each data unit of the plurality of data flows, where the values, generated for the data units of the particular data flow, identify the particular data flow, and where the group of entries corresponding to the particular data flow are stored based on the values generated for the data units of the particular data flow.

16. The system of claim 15, where the device is further to:

determine whether the particular data unit, of the data units of the particular data flow, is the head data unit of the particular data flow, based on the value generated for the particular data unit, and store, in the second memory, information associated with the particular data unit when the particular data unit is the head data unit of the particular flow unit.

17. The system of claim 15, where the device is further to:

determine, based on the value generated for a data unit of the particular data flow, whether the data unit is a last data unit of the particular data flow;

store, in a third memory, information identifying the data unit based on a result of whether the data unit is the last data unit of the particular data flow, where the third memory stores information identifying a last data unit of each data flow of the plurality of data flows.

18. The system of claim 17, where, when transmitting the data units of the particular data flow, the device is to:

transmit the data units, of the particular data flow, further based on the information, stored in the third memory, identifying the data unit.

19. The system of claim 14, where one or more entries, of the group of entries corresponding to the particular data flow, identify one or more other entries of the group of entries corresponding to the particular data flow.

20. The system of claim 14, where the particular data unit corresponds to a first data unit of the particular data flow, where the other data unit corresponds to a second data unit of the particular data flow, and where the second memory stores information identifying the particular data unit.

* * * * *